Sept. 12, 1939.  N. A. CHRISTENSEN  2,172,788
AUTOMOBILE WHEEL AND BRAKE MECHANISM
Filed July 16, 1935  6 Sheets-Sheet 1

INVENTOR
NIELS A. CHRISTENSEN
BY
*Louis W. Kelmuth*
ATTORNEY

Sept. 12, 1939.   N. A. CHRISTENSEN   2,172,788
AUTOMOBILE WHEEL AND BRAKE MECHANISM
Filed July 16, 1935   6 Sheets-Sheet 2
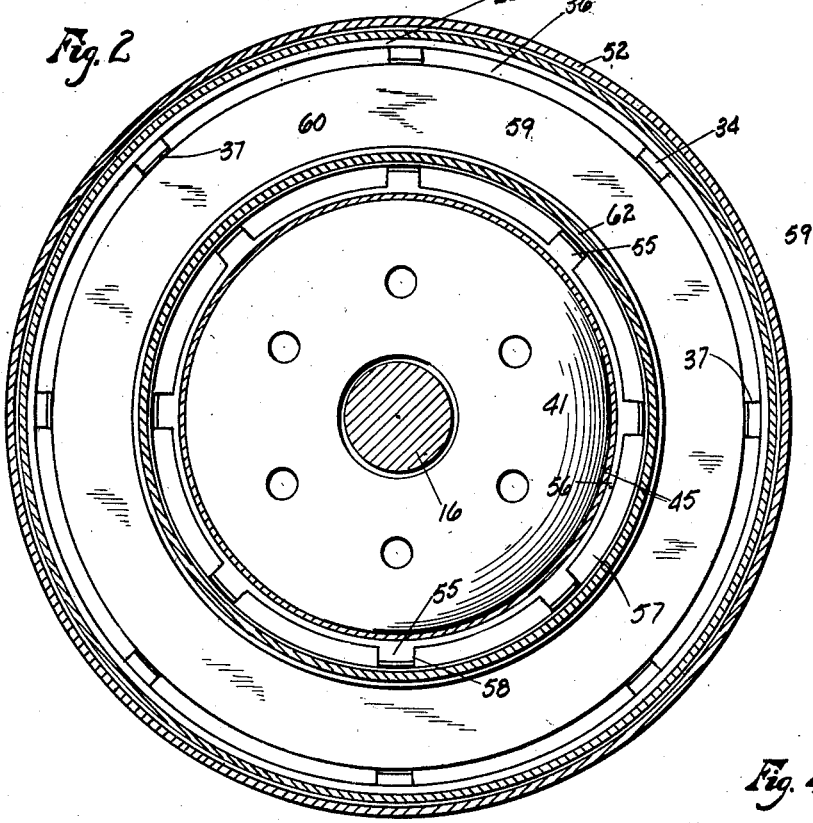
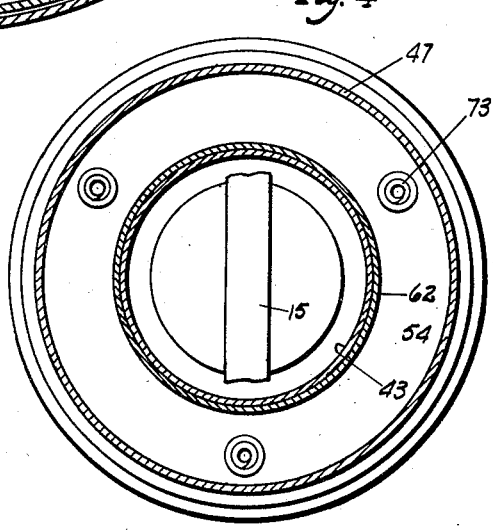
INVENTOR
NIELS A. CHRISTENSEN
BY
ATTORNEY

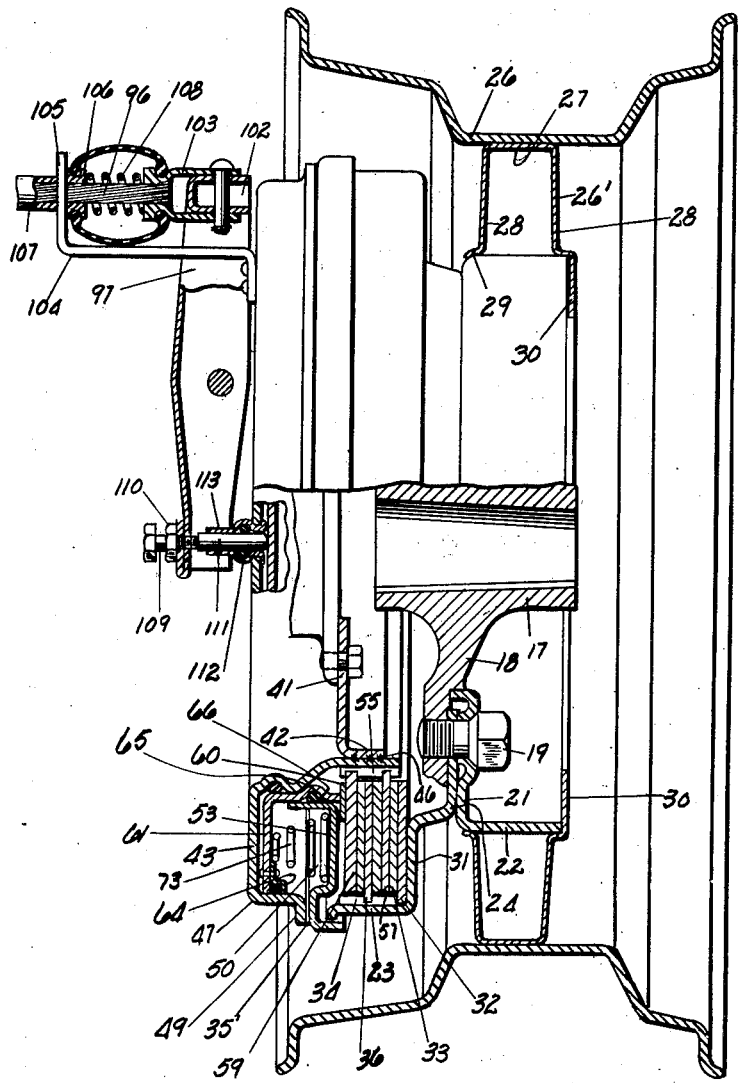

Sept. 12, 1939.   N. A. CHRISTENSEN   2,172,788
AUTOMOBILE WHEEL AND BRAKE MECHANISM
Filed July 16, 1935    6 Sheets-Sheet 5
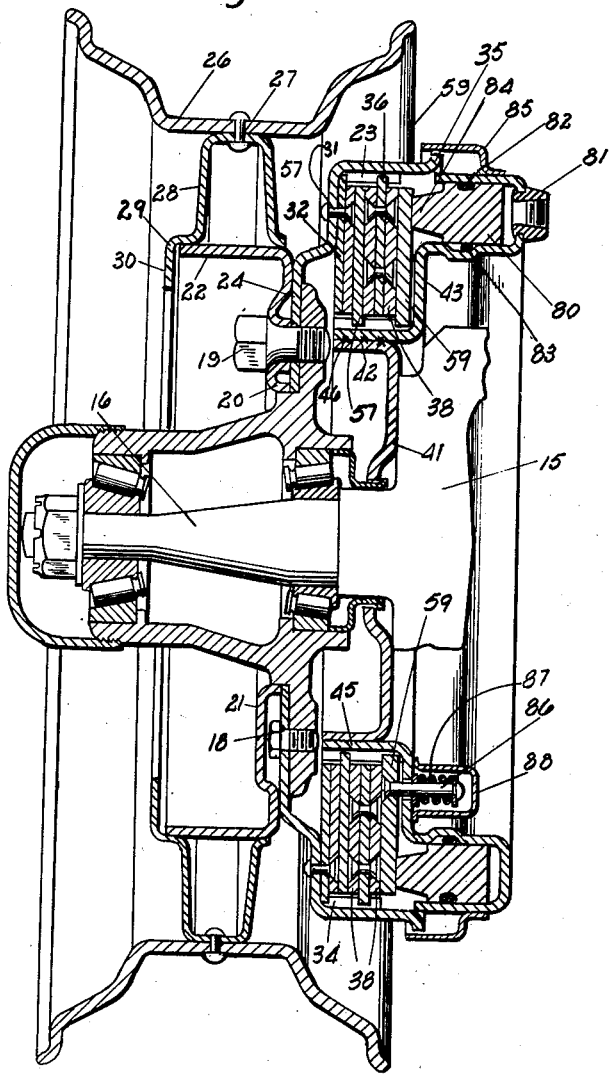
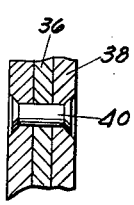
INVENTOR
NIELS A. CHRISTENSEN
BY
ATTORNEY

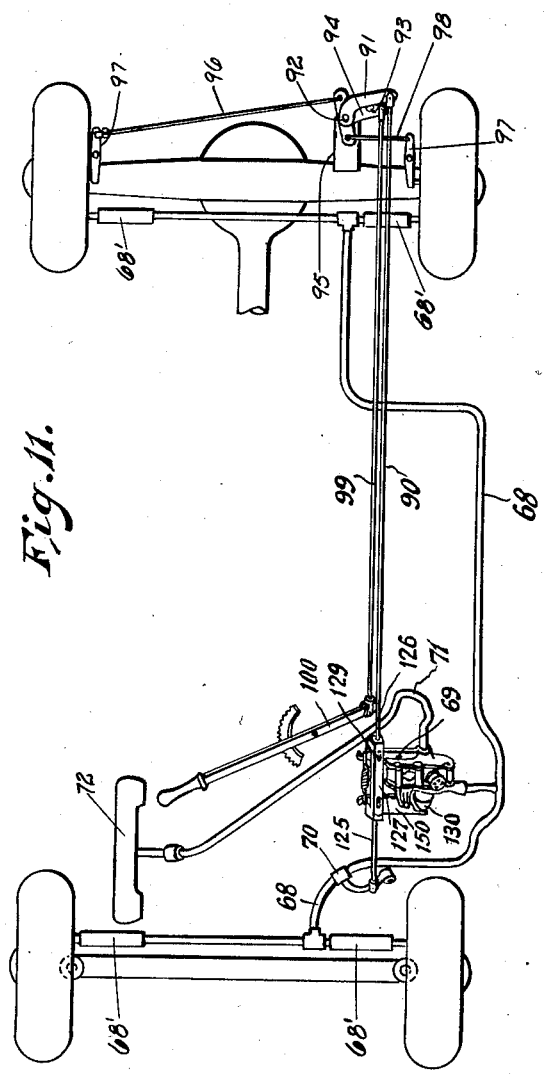

Patented Sept. 12, 1939

2,172,788

UNITED STATES PATENT OFFICE 2,172,788

AUTOMOBILE WHEEL AND BRAKE MECHANISM

Niels Anton Christensen, South Euclid, Ohio

Application July 16, 1935, Serial No. 31,657

21 Claims. (Cl. 188—72)

This invention relates to new and useful improvements in automobile wheels and brake mechanisms therefor.

An important object of the invention is to provide a disc type brake mechanism having parts which are standard for different braking capacities as well as for different types of wheels having different distances between the aprons thereof and the longitudinal center line of the wheels.

Another important object of the invention is to provide an apron construction providing an annular fluid medium pressure chamber adaptable for the actuation of the friction element of the brake mechanism by means of any fluid medium.

A further object of the invention is to provide mechanical means for operating this type of brake with physical force alone or in conjunction with a power actuation derived from a fluid medium such as air, vacuum or hydraulics.

Other objects and advantages of the invention may become apparent during the course of the following description.

Figure 1:
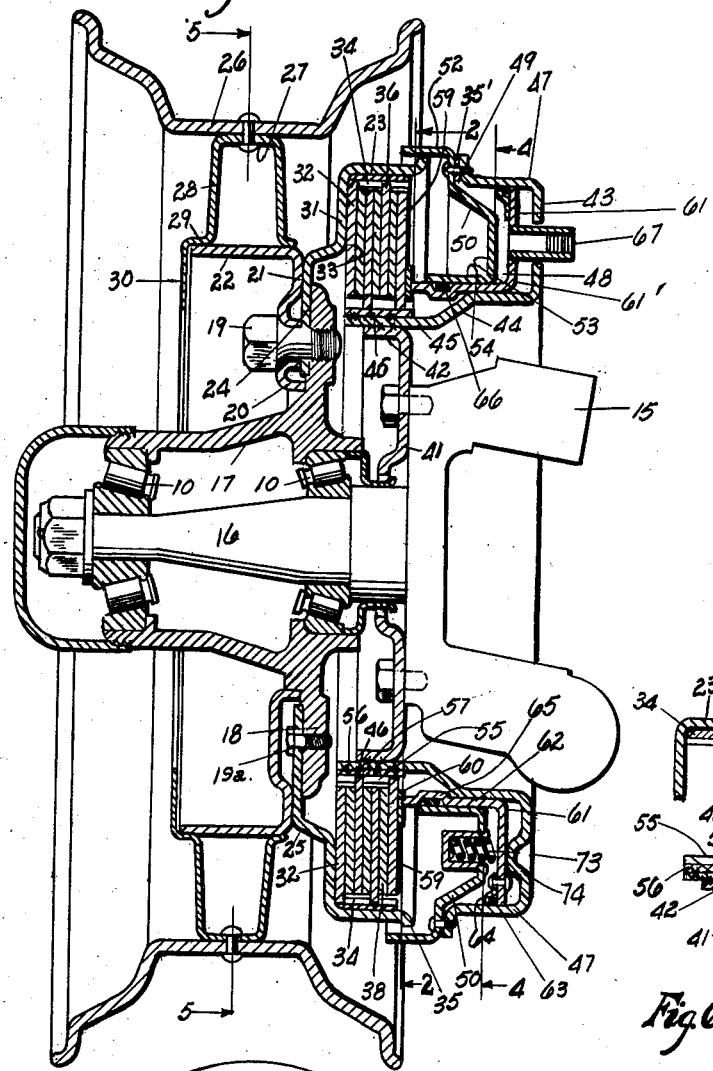
Figure 5:
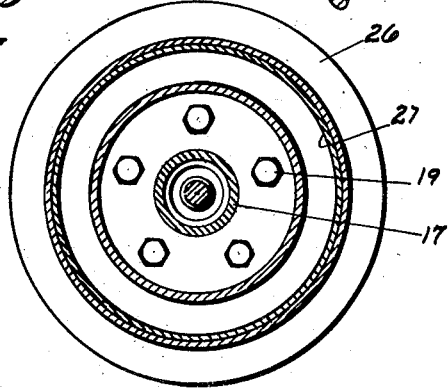
Figure 6:
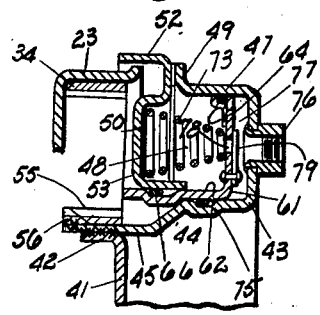
Figure 6A:
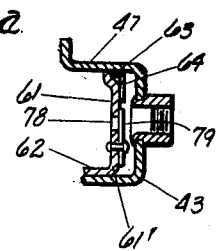
Figure 3A:
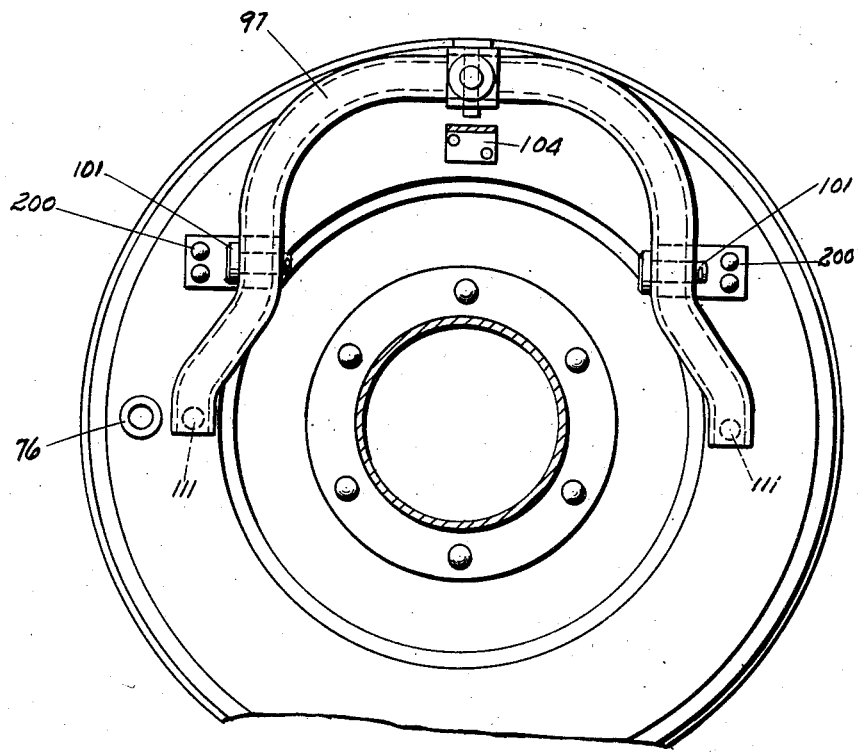
Figure 12:
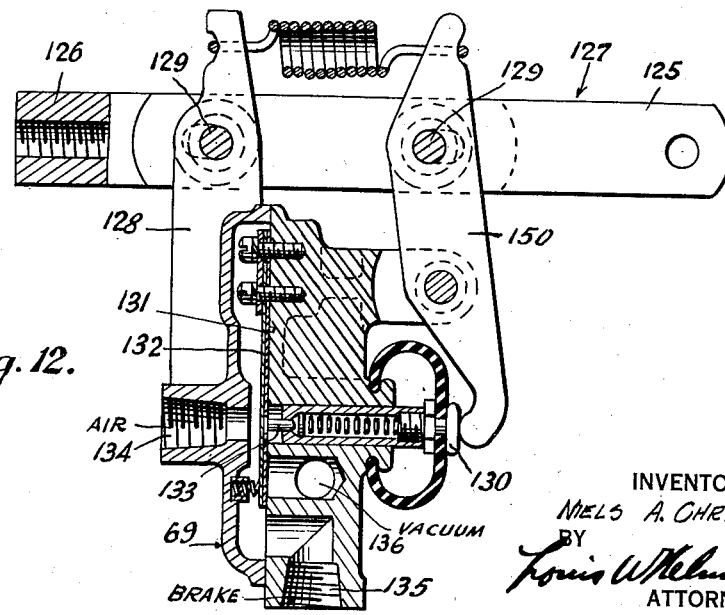

In the accompanying drawings forming a part of the description and wherein like numerals are employed to designate like parts throughout the several views, Fig. 1 is a section of a front wheel and brake mechanism, longitudinally of the axis of the wheel, Fig. 2 is a transverse section through the axis on the line 2—2 of Fig. 1, Fig. 3 is a partial fragmentary section of a rear wheel and brake mechanism, Fig. 3a is a rear elevation thereof showing an emergency brake actuator, Fig. 4 is a corresponding section on a small scale, taken along the lines 4—4 of Fig. 1, Fig. 5 is a transverse section on a smaller scale taken along the lines 5—5 of Fig. 1, Fig. 6 is a fragmentary section of a modification of the brake chamber illustrated in Fig. 1 adapted for vacuum suspended operation of the brake, Fig. 6a is a similar view illustrating a different type of piston packing, Fig. 7 is a section of the wheel and brake mechanism shown in Fig. 1 designed for compressed air or hydraulic operation of the brake mechanism, Fig. 8 is a fragmentary detail showing one manner of connecting the brake lining to opposite faces of a disc element, Fig. 9 is a fragmentary elevation and cross section of the type of sealing rings employed, Fig. 10 is a fragmentary view showing another manner of connecting the brake lining with the brake disc, Fig. 11 is a diagrammatic illustration of the brake hookup to a vehicle for actuation of the brakes manually or with a fluid medium, Fig. 12 is a side view of the control valve.

In the form of invention shown in Figs. 1 and 7, a front steering wheel of a vehicle has been illustrated, having a steering knuckle 15 provided with the usual stub axle 16, forming the axis of the wheel. A wheel hub 17 is rotatably mounted on the axle in the usual manner with antifriction bearings 10 and is provided with a radially extending web or flange 18 having circumferentially spaced threaded openings for the reception of bolts or screws 19. This flange 18 is further provided with seats as illustrated, one of them receiving an inwardly turned edge portion 20 of a radially extending flange 21 of a ring stamping 22. A brake containing drum 23, preferably a stamping has an annular offset portion 25, and a radial web portion 24 apertured for the reception of bolts 19 to be clamped between the flanges 18 and 21. In Fig. 7, the innermost margin of flange 24 of the drum is engaged by the free edge of the inturned flange 20 as illustrated. The edges of the bolt apertures in flange 21 are turned inwardly to seat against drum flange 24. This construction insures a very rigid connection of the drum with the wheel hub. Screws 19a are provided for holding the drum in fixed position to the hub when for any reason the wheel 26 is temporarily dismounted.

In order to connect the rim 26 of the wheel with the ring 22, a pressed inwardly facing channel-shaped metal ring or spoke 28, is provided with its web 27 weldled or riveted to the rim and its inwardly diverging legs 28 flanged outwardly as at 29 for welding to the ring 22 adjacent its opposite edges. The outermost leg 28 of the channel ring is continued radially inwardly as at 30.

The web 24 of the brake containing drum is offset outwardly of the wheel as at 31 and a thrust disc carrying friction lining 33 is fastened to this web of the drum by any suitable means. The axially extending or flange portion of the brake containing drum is provided at circumferentially spaced points with axial keys 34 weldled or otherwise suitably secured to the drum. The outer periphery of thrust plate 32 is provided with a corresponding number of inwardly extending notches to fit over the keys to retain the thrust plate fixed against rotation relative to the drum. The free edge 35 of the drum is turned radially outward to cooperate in forming a dust and water shield.

A friction disc 36 is provided about its periphery with a plurality of circumferentially spaced radial notches 37 to fit the keys 34 fastened to the drum whereby the disc is movable axially of the drum but is precluded from rotation relative thereto. This disc is preferably faced on opposite sides with lining material 38 which in Fig. 8 is moulded on the disc and extends through openings 39 therein to assist in anchoring the moulded material to the disc. In Fig. 10 the lining 38 is riveted to opposite faces of the disc by means of the usual rivets 40.

In order that the braking capacity of the brake mechanism can be varied, provision is made for the association of various wheel structures to the brake mechanism. A backing plate or apron 41 is secured to the steering knuckle 15 or other fixed non-rotative part of the vehicle and is provided at its margin with an axially extending flange 42 to provide an adjustable mounting for the fluid pressure mechanism. The housing for this fluid pressure mechanism may be considered a part of the apron or backing plate as it cooperates therewith in forming a closure for the drum. It consists essentially of a channel shaped annular stamping 43 having the channel thereof facing outwardly toward the wheel and drum, with its inner annular flange offset at 44 and terminating in a marginal portion 45 parallel to the body of the flange 42 to fit thereover. This marginal portion 45 slidably engages the axial flange 42 of the apron so as to be adjustable prior to assembly to accommodate different numbers of friction discs and varying wheel hub constructions. This adjustability is effected in any desired manner, but is here illustrated as a sliding fit between these two flanges so that after their relative positions have been determined by the number of friction discs to be used and the wheel hub construction, they may be welded together as indicated at 46.

The other flange 47 of this channel stamping parallels the body of the complementary flange 44 to cooperate in forming stationary walls of an annular fluid medium chamber 48 concentric with the drum and arranged in substantial alignment with the disc 36. The margin of this flange 47 is turned radially outwardly as at 49 to be fastened to an intermediate portion of a somewhat channel-shaped ring stamping 50 with a packing ring 35' secured between the same to render the annular fluid medium chamber 48 formed by these stampings, air tight at this point. The ring 50 is provided with an outwardly extending axial flange 52 concentric with the drum 23 and overlapping the outwardly turned margin of the latter to form a dust and liquid seal for the drum. In Fig. 1, the medial portion of the stamping 50 is inclined outwardly as illustrated to dispose an inner radial portion 53 slightly within the confines of the chamber 48 and the inner axial flange 54 parallel with and spaced from the inner annular flange of stamping 43. The walls 47 and 53 of these two stampings form the two stationary walls of the chamber 48.

A plurality of circumferentially spaced keys 55 are secured to the annular flange 45 of stamping 43 as in Figs. 3 and 7 or to a ring 56 carrying these keys secured to the margin 45 of the stamping as in Fig. 1. A disc 57 (Fig. 2) is provided on its inner periphery with circumferentially spaced notches 58 to receive the keys 55 so as to be slidable axially relative to the apron but is fixed against rotation relative thereto. This disc 57 may or may not be faced with lining material on opposite sides and is disposed between the lining carrying discs 32 and 36. Of course, any number of these complementary friction discs may be disposed within the drum as may be required for any particular brake installation.

In order to move the respective discs and their linings into close engagement to retard the rotation of the drum and wheel, a thrust disc 59 is arranged inwardly of the innermost friction disc and is splined on the keys 55 of the apron so that it may move axially of the drum but is precluded from relative rotation therewith. The innermost face of this disc (Figs. 1 and 3) is provided with a composition heat insulating ring 60 for a purpose which will presently appear.

To move the thrust plate 59 in a direction to create friction between the complementary friction discs and the drum for retarding its rotation, an annular piston in Figs. 1 and 3 is provided for the annular brake chamber 48 by means of a stamping of L-shaped cross section, indicated in its entirety by the numeral 61'. The radial arm of this L-shaped annular stamping forms substantially the body of the piston while the axially extending arm or flange 62 forms, in effect, a skirt thereof which is slidably engaged between the axial wall of the brake chamber and the annular flange 54 of the stamping 50. The outer edge of the radial piston flange cooperates with an annular ring 64 of appropriate cross section in forming a packing groove for the piston which is slightly wider than the compressed condition of a packing ring 63 of normally circular cross section, engaging the annular wall 47. When this packing ring is in operative position, it is compressed into substantially ellipsoidal cross section so that as the piston reciprocates the rubber ring is kneaded or worked to prolong its life. (As disclosed in my co-pending application Serial No. 704,463). The axial arm 62 of this piston is pressed with an annular groove 65 therein to receive another rubber ring 66 like the one just described so that it engages the axial annular flange 54 of stamping 50. In this manner, the annular chamber 48 defined by the stationary walls 47, 50, and movable walls 62 and 61, is rendered air tight. In the air suspended type Fig. 1 the piston is provided at a suitable point in its circumference with a nipple 67 for connection to vacuum hose or piping with flexible rubber sections 68', (see Fig. 11) which are connected by common piping 68 to a control valve 69 which normally, and in brake release position, admits air into the conduit 68 whereby air at atmospheric pressure exists on opposite sides of the piston 61. It will be noted that this nipple 67 is disposed substantially in vertical alignment with the axis of the king pin which passes through the steering knuckle 15 so that the flexible hose connections to this nipple will not be unduly bent during the normal steering of the front wheels. The valve 69 is operated by the usual brake pedal 70 so as to cut off its communication with air at atmospheric pressure and open the conduits 68 to a vacuum conduit 71 connected to the intake manifold 72 of an internal combustion engine so that air at atmospheric pressure in the brake chamber 48 (Fig. 1) will be withdrawn to create a partial vacuum therein which will cause the piston 61 to move to the left of the Fig. 1 and engage the heat insulating ring on thrust plate 59 to move the latter to the left and thereby force the friction discs 36 and 57 into engagement with the lining bearing portion 33 fixed to the drum to thereby retard rotation of the wheel. As soon as the valve 69 is operated by release movement of the brake pedal 70, atmospheric communications will be re-established to destroy the partial vacuum created in the brake chambers 48 at which time a series of return coil springs 73, Fig. 1, disposed in the brake chamber at points spaced circumferentially thereof will return the piston 61 to normal position and thereby release the frictional engagement between the various friction discs of the brake. This separation of the friction discs is caused by the natural tendencies for the discs to free their interengagement when the thrusting force is relaxed or completely released and upon destruction of the partial vacuum existing in the brake chamber. The brake chamber may be provided with suitable stops 74 to limit the retractile movement of the annular piston 61.

In the modified form of brake chamber shown in Fig. 6 adapted for vacuum suspended operation, the parts are the same as in Fig. 1 with the exception of the form of piston 61 and stamping 43. In this type where the operation requires a sub-atmospheric pressure on both sides of the piston 61 when in brake release position; the inner flange of stamping 43 is formed with an annular groove 75 in which a composition or rubber ring similar to 66 is positioned for sealing engagement with the flange 62 of the piston. In addition, the inner wall of stamping 43 is provided with a nipple 76 for attachment to the conduit 68 so that a partial vacuum is normally maintained in this conduit by appropriate porting in the control valve 69 as disclosed in my copending application Serial No. 604,203. The piston 61 is provided with an aperture 78 which is closed by a suction operated clack valve 79 secured to the piston. Consequently, when vacuum exists in chamber 77 it sucks the valve 79 open, to create corresponding partial vacuum in chamber 48 so that the piston is normally submerged in a partial vacuum. When the foot pedal 70 is operated to apply the brakes, valve 69 is moved to dump air into the conduits 68 and therefore into chamber 77. This causes the clack valve 79 to automatically close maintaining the partial vacuum in chamber 48 whereby the higher air pressure on the outer face of the piston moves it to the left of the Figs. 6 and 7 to operate against the thrust plate 59 and thereby apply the brakes.

In Fig. 7 another modified form of annular chamber for receiving the fluid medium is illustrated and is particularly adaptable for air pressure above atmospheric or hydraulic pressure for the actuation of a ring type piston 80 slidably mounted in the channel stamping 43 which is generally like the stamping 43 in previously described forms. The fluid medium enters this stamping through the nipple 81 thereby spending its force against the ring type of piston 80 which thrusts against a disc brake of the construction shown in Fig. 1. The piston 80 is packed by an outer packing ring 82 like 66 seated in an annular groove of the piston and an inner packing ring 83 seated in a groove in the axial wall of stamping 43. The piston 80 is provided with an axial reduced section 84 adapted to contact with the thrust plate 59. In order to exclude dust and extraneous matter from the brake drum, an annular shield 85 of Z-shape cross section is fixed to the outer surface of stamping 43 by one flange so that its parallel flange overlaps the free edge 35 of the brake drum as illustrated.

In order to return the thrust plate 59 and piston ring to normal position upon release of the fluid pressure acting against the piston, pins 86 are fixed at circumferentially spaced points to the ring to extend through the radial flange of stamping 43 which in this instance has its intermediate portion substantially parallel to the thrust plate. Compression springs 87 surround each of these pins and bear against an abutment carried by the free end thereof. Dust guards 88 cover the springs and surrounded pins and are fixed to the radial portions of stamping 43.

In order that these brakes and particularly the two rear brakes of a vehicle may be operated manually as well as by a fluid medium, Fig. 11 shows the valve 69 and foot pedal 70 connected by a rod or cable 90 which also is connected to a free end of a lever 91 fulcrumed as at 92 at its opposite end with the intermediate portion thereof bearing against the pin 93 or other form of abutment carried by a T shaped lever 94 fulcrumed also at 92. This fulcrum is carried by a bracket 95 extending from the rear axle housing. The cross arm of the T lever is connected at one end by a cable or rod 96 running over transversely to a lever 97 adjacent a rear wheel on one side of the vehicle, while the opposite end of the arm is connected by a cable or rod 98 to a similar lever 97 mounted adjacent the opposite wheel of the vehicle.

While various forms of vacuum control valves 69 may be employed as well as various connections thereof to the brake pedal, the valve 69 as stated hereinbefore, may be like the valve in my co-pending application Serial No. 604,203 and the same hookup to the pedal may be used as shown in Fig. 11. In this sort of hook up, the rod 90 from the foot pedal 70 to the lever 91 would be made in two sections 125 ad 126 with their adjacent ends provided with overlapping or telescopic yokes 127 so that section 125 can move with the pedal a predetermined degree before taking up and moving section 126. The valve 69 is provided with an extension 128 which is partially supported by a pin 129 carried by the outer yoke 127 and operating in a slot in the arms of the inner yoke. This valve is also partially supported by a valve operating lever 150 fulcrumed on the valve casing 69 and having its upper end carrying a pin which extends through slots in the arms of the outer yoke 127 so that when the foot pedal 70 is depressed, the rod section 125 fulcrums this lever on its fulcrum without moving rod section 126. This work end of this lever 150 engages a valve operating plunger 130 in the valve casing to operate a pair of leaf spring valve elements, as best shown in Fig. 12. This plunger 130 is adapted to open valve 131 after valve 132 has been moved to its seat by auxiliary plunger 133 telescopically mounted in plunger 130 and backed by a spring to normally retain it in projected position and to yield after seating the valve 132.

The flexible vacuum pipe 71 from the manifold 72 is connected to port 136 of the valve casing while flexible tubing connects the port 135 to pipe 68 for conducting differential pressures to the four wheels. The port 136 in the valve casing communicates with the atmosphere. The vacuum port 136 is normally cut off from the brake chambers by the valve 131 when the system is hooked up as an air suspended system. When the hook up is for vacuum suspension of the pistons in the brake chambers, the pipe connections to ports 134 and 136 are simply reversed so that the piston in the brake chamber is normally submerged in partial vacuum when the brake pedal is in release position. With this hookup it will be seen that any time the vacuum power fails, the brake mechanisms can be actuated by physical force alone since the lost motion in the yokes 127 will be taken up upon initial pedal movement and thereafter both sections 125 and 126 of the brake rod will be moved simultaneously with the pedal. While this type of valve has been specifically illustrated and described, it will be understood that various other forms of valves may be used equally as well in this hook up. A cable 99 connects the stem of the T lever 94 to an emergency and parking brake hand lever 100 so that operation of either the foot pedal or the hand lever causes manual operation of the two rear brakes of a vehicle through the instrumentality of the mechanical brake actuator which will now be described.

The levers 97 are more clearly shown in Figs. 3 and 3a and may be mounted in any plane which is convenient. Each lever 97 is of generally U-shape, constructed from a stamping having channel shaped cross section. The arms of this lever are fulcrumed at spaced points as at 101 on any suitable support 200 from the axle, apron or steering gear and as illustrated in Fig. 3. The upper arched portion of this lever is pivotally connected at 102 with a clevis 103 to which is secured one end of the cable 96. A bracket 104 is fastened to the stamping 43 and has an upturned arm 105 in which is mounted an end fitting 106 of a flexible conduit 107. A coil spring 108 surrounds the cable and abuts the yoke 103 and fitting 106 so as to be compressed when the cable is drawn to apply the brakes mechanically.

The lower end of each arm 97 is provided with a brake adjusting screw 109 locked in position by lock nut 110. The end of this screw is adapted to abut a thrust pin 111 packed and slidably mounted in a fitting 113 secured in the inner wall of stamping 43 with its inner end in thrust engagement with the radial wall 61 of the piston. One of these thrust pins is mounted on either side of the axis of the stamping so that equal thrust is exerted against two diametrically opposed points on the piston. In the case of a vacuum suspended type of piston chamber as shown in Fig. 6, the opening through the stamping 43 should be packed air tight with a rubber packing ring 112 or other suitable packing. As the disc lining wears down on the friction elements, the screws 109 are adjusted to move the thrust pins 111 further inwardly to take up the slack occasioned thereby.

It is to be understood that various changes in the size, shape and arrangement of parts may be resorted to without departing from the spirit of the invention or the scope of the appended claims.

I claim:

1. The combination with the wheels of a motor vehicle, a brake mechanism for each wheel, an independent power chamber concentric with each wheel, a fluid actuated piston in said chamber for operating the brake mechanism by the fluid medium or by physical manual power, and an independent manually operable brake actuator for each brake mechanism operable to move said piston by physical manual power and independently of the fluid medium upon failure of the latter.

2. A brake comprising a drum, an apron therefor having an annular chamber concentric with said drum, complementary friction members splined on said drum and apron, and an annular piston in said chamber adapted to thrust said friction members and carrying a conduit through the apron for conveying fluid medium to said chamber through said piston.

3. A brake comprising a drum, a brake mechanism therein, an apron for the drum having an axially extending annular part, an annular chamber telescopically mounted on and fixed to said axially extending part of said apron at any desired distance from said drum, and means in said chamber for operating the brake mechanism.

4. A brake comprising a drum, a brake mechanism therein, a non-rotatable apron fixed to a front or rear axle and having an axially extending annular part, an annular chamber held in concentric position by said apron, and telescopically adjustable on said axially extending part of said apron, means for immovably connecting said apron and annular chamber in relative adjustments, and means in said chamber for operating the brake mechanism.

5. A brake comprising a drum, a stationary annular chamber concentric therewith, a thrust member between the drum and chamber, an annular piston mounted in said chamber and dividing the same into two compartments, and means for controlling differential pressures in said compartments for moving said piston to move said thrust member.

6. A brake comprising a drum, a stationary annular chamber concentric therewith, a thrust member between the drum and chamber, an annular piston mounted in said chamber and dividing the same into two compartments, said piston having a normally open valve controlled passage in brake release position, and said passage being automatically closed upon creation of differential pressures in said compartments.

7. A brake comprising a drum, an apron therefor formed with an annular brake chamber concentric with said drum, complementary friction members splined on said drum and brake apron, and an annular substantially L-shaped piston mounted in said chamber and forming a pair of relatively movable walls thereof, said piston adapted to thrust said complementary members together.

8. A brake comprising a drum, an apron therefor, a channel-shaped ring concentric with the drum and fixed to said apron, an annular member fixed to said ring and forming an annular chamber concentric with said drum, complementary friction members splined on said drum and ring, and an annular piston in said chamber having a flange slidably engaging the walls of said ring and annular member and arranged to thust said complementary friction members together.

9. A brake comprising a drum, an apron therefor, a channel-shaped ring concentric with the drum and fixed to said apron, a substantially channel-shaped annular member fixed to said ring and having its inner flange parallel to and spaced from an axial wall of said ring to form an annular brake chamber concentric with said drum, complementary friction members splined on said drum and ring, and an annular piston in said chamber having an axial flange slidably received between said parallel walls of said ring and member and in thrusting engagement with one of said complementary friction members.

10. A brake comprising a drum, an apron having an axial flange concentric with said drum, a channel shaped pressed metal ring having its inner flange secured to that of the apron and its outer flange having its margin turned normal to the axis of the drum, a substantially channel-shaped annular member fixed to said margin and having its inner margin parallel to and spaced from an axial wall of said ring to form an annular brake chamber concentric with said drum, complementary friction members splined on said drum and ring, and an annular piston in said chamber having an axially extending flange slidably received between said parallel walls of said ring and member and in thrusting engagement with one of said complementary friction members.

11. A brake comprising a drum, a relatively stationary channel-shaped ring concentric with and opening toward said drum, an annular member partially closing the channel and having an axially extending axial flange parallel to and spaced from an axial wall of said channel-shaped ring, an annular piston having sealing engagement with the outer annular wall of said channel, said piston having an annular axially extending flange slidably received between the axial walls of said ring and member and forming a thrust part, and means forming a seal between the piston flange and one of said walls.

12. A brake comprising a drum, a relatively stationary channel shaped ring concentric with and opening toward said drum, an annular member partially closing the channel and having an axially extending axial flange parallel to and spaced from an axial wall of said channel-shaped ring, an annular piston having sealing engagement with the outer annular wall of said channel, said piston having an annular axially extending flange slidably received between the axial walls of said ring and member and forming a thrust part, and means forming seals between the piston flange and both of said walls.

13. A brake comprising a drum, a stationary annular chamber concentric therewith, a thrust member between the drum and chamber, an annular piston mounted in said chamber and dividing the same into two compartments, and spring means disposed in one of said compartments for moving the piston to inactive position.

14. A brake comprising a drum, an apron member defining a stationary annular chamber concentric therewith, a thrust member between the drum and chamber, an annular piston mounted in said chamber, and spring means between the apron member and piston for normally urging said piston to inactive position.

15. The combination with the wheels of a motor vehicle, a source of power, a brake mechanism for each wheel, an independent fluid medium power chamber concentric with each wheel and the brake mechanism therefor for operating the latter, a fluid actuated piston in said chamber for operating the brake mechanism, conduit means from said source to said chamber, means for controlling the passage of medium through said conduit means, and an independent manually operable brake actuator for each brake mechanism operable to move said piston by physical manual power and independently of the movement of the piston by the fluid medium upon failure of the fluid medium.

16. The combination with the wheels of a motor vehicle, a drum having a backing plate for each wheel, a brake mechanism in each drum, an independent power chamber formed in the backing plate and concentric with each wheel, a fluid actuated piston in each chamber for operating each brake mechanism by the fluid medium or by physical manual power, and independent manually operable thrust members extending into said power chambers to move said piston by physical manual power independently of the fluid medium upon failure of the latter.

17. The combination with a motor vehicle having four wheels, a foot pedal, a brake mechanism for each of the wheels, a power chamber for each of the four wheels, a fluid actuated piston in each chamber for operating the brake mechanism by the fluid medium or by physical power, a manually operable brake actuator for each brake mechanism to move said pistons by physical manual power and independently of the fluid medium upon failure of the latter, and mechanical connections between said actuators and foot pedal for simultaneous manual operation thereof.

18. The combination with a motor vehicle having four wheels, a foot pedal and an emergency lever, a brake mechanism for each of the wheels, a power chamber for each of the four wheels, a fluid actuated piston in each chamber for operating the brake mechanism by the fluid medium or by physical power, a manually operable brake actuator for each brake mechanism to move said pistons by physical manual power independently of the fluid medium upon failure of the latter, a pair of concentrically mounted levers, one of which is connected to said brake actuator associated with the rear wheels and to said emergency lever to operate independently of the other lever, and said other lever being connected with said pedal and adapted to operate its concentric lever.

19. A brake comprising a drum, a brake mechanism therein, a stationary annular chamber concentric with said drum, an annular piston in said chamber for operating the brake mechanism, a member secured to the chamber and closing one end thereof and having a flange engaging said piston and a second flange cooperating with the free edge of the drum.

20. A brake comprising a drum, a brake mechanism therein, a stationary annular chamber concentric with said drum, an annular piston in said chamber for operating the brake mechanism, a member secured to the chamber and closing one end thereof and having a flange extending inwardly of the chamber to engage the piston and a second flange extending in the opposite direction and cooperating with the free edge of the drum.

21. The combination with a motor vehicle having four wheels, a foot pedal, an emergency lever, a valve connected with a source of fluid medium, a brake mechanism for each of the wheels, a power chamber for each of the four wheels, a fluid actuated piston in each chamber for operating the brake mechanism by the fluid medium or by physical power, a manually operable brake actuator for each brake mechanism to move said pistons by physical manual power and independently of the fluid mechanism upon failure of the latter, and said brake actuator being connected with said valve and with said pedal with a lost motion connection and adapted to operate the brake mechanism upon failure to operate the pistons with fluid medium.

NIELS ANTON CHRISTENSEN.